United States Patent [19]
Milo

[11] 3,858,246
[45] Jan. 7, 1975

[54] PROSTHETIC CARDIAC VALVES

[76] Inventor: Simcha Milo, 1500 E. Riverside, Apt. 204 D, Austin, Tex. 78741

[22] Filed: Apr. 19, 1973

[21] Appl. No.: 352,590

[52] U.S. Cl. .................. 3/1, 3/DIG. 3, 137/533.19, 137/533.23, 137/533.25, 137/533.27
[51] Int. Cl. .............................................. A61f 1/22
[58] Field of Search ....................... 3/1, DIG. 3; 137/533.17–533.29

[56] References Cited
UNITED STATES PATENTS

| | | | |
|---|---|---|---|
| 3,451,067 | 6/1969 | Jordan | 3/1 |
| 3,503,079 | 3/1970 | Smith | 3/1 |
| 3,601,877 | 8/1971 | Goosen | 3/1 X |

OTHER PUBLICATIONS

"Use of Power Spectral Density Analysis for the Evaluation of Artificial Heart Valves" by R. K. Pomeroy, Journal of the Assoc. for the Advancement of Medical Instrumentation, Vol. 5, No. 4, 3 DIG. 3, July–August 1971, pp. 210–217.

Primary Examiner—Ronald L. Frinks

[57] ABSTRACT

Prosthetic cardiac valves for disposition in the heart and the aorta for controlling the pulsatile flow of blood in and from the heart, wherein positive opening and closing guiding action is effected and a minimum of turbulence of the blood across the valve occurs when the valve is open.

6 Claims, 6 Drawing Figures

Patented Jan. 7, 1975

PROSTHETIC CARDIAC VALVES

BACKGROUND OF THE INVENTION

The field of this invention is prosthetic cardiac valves.

Various types of prosthetic cardiac valves have been developed in recent years, most of which are believed to be described in "The Journal of Cardiovascular Surgery," Vol. 63, No. 1, January 1972, pages 131-142.

SUMMARY OF THE INVENTION

This present invention relates to prosthetic cardiac valves which create streamlined contoured flow around the valve in the open position with a minimum of turbulence of the blood, and which have positive axial guiding means to prevent vibrations or deviations from axial movement to and from the open and closed positions, whereby turbulence of the blood is minimized and is essentially eliminated.

DESCRIPTION OF THE PREFERRED EMBODIMENTS

Figure 1:
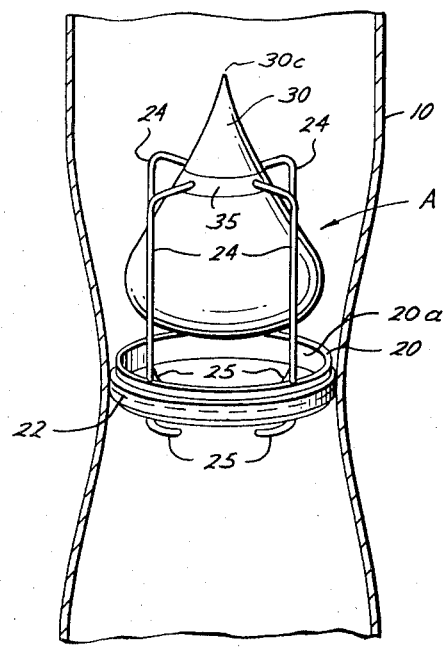
FIG. 1 is an isometric view of one form of the cardiac valve of this invention, shown in the open position in the aorta.

In the drawings, the letter A designates generally one form of the cardiac valve of this invention which is adapted to be disposed in the heart or in the aorta 10, for replacing the mitral valve, tricuspid valve or aortic valve, respectively, as will be more evident hereinafter. The valve A is surgically mounted in the aorta 10 by suturing or by any other surgical means as is well-known in the art. Broadly, the valve A includes an annular valve seat 20 and a tear-shaped valve element 30 which is adapted to move from a seated or closed position (FIG. 2) to an open position (FIG. 1) for movements in response to the pulsatile flow of blood from the heart so that the valve A performs the function of the natural cardiac valve which is replaced by the valve A.

Figure 2:
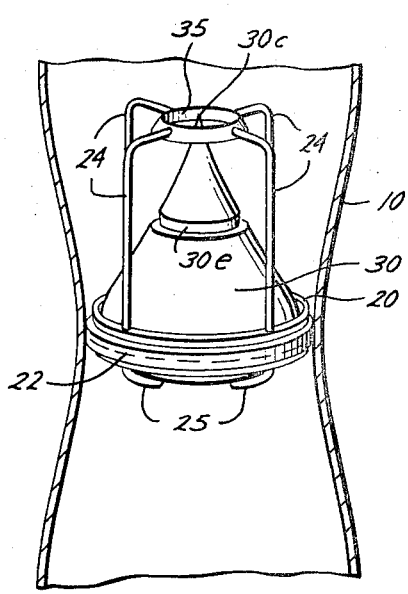
FIG. 2 is a view similar to FIG. 1, but showing the valve in the closed position.
Figure 3:
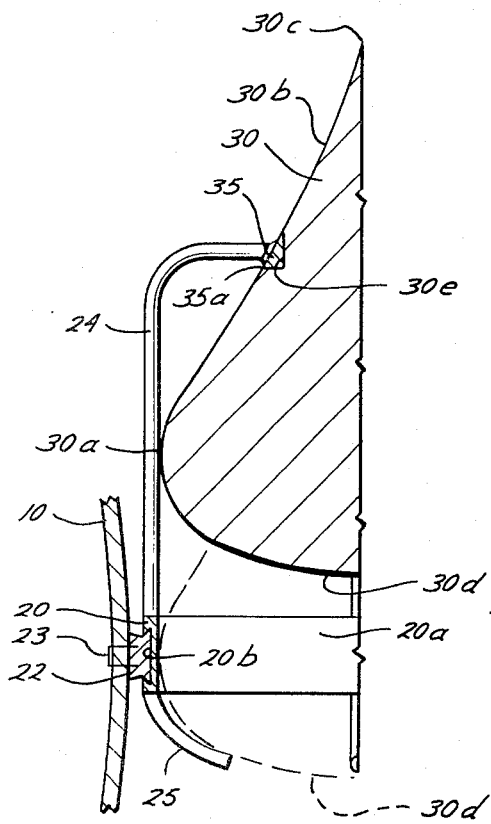
FIG. 3 is a sectional view of the valve of FIGS. 1 and 2, showing the valve in solid lines in the open position and in dash lines in the closed position.

Considering the invention more in detail, and particularly the form shown in FIGS. 1-3 of the drawings, the annular valve seat 20 is preferably formed of stainless steel or other suitable noncorrosive material and it has an inner valve seating surface 20a. For securing the valve seat 20 to the aorta 10, it is preferred to provide a ring of attaching material such as the terephthalate polyester sold under the trademark "DACRON." The attaching material 22 is preferably also in a ring and is imbedded or bonded in a groove 20b on the external surface of the ring 20 (FIG. 3). The surgeon sutures the attaching ring 22 to one of the aortic, mitral or tricuspid rings with sutures 23 or other suitable surgical means.

The valve A has suitable guide means for axially guiding the axial movement of the valve element 30 to and from the open and closed positions. Such guide means preferably includes a plurality of longitudinally extending guide rods or elements 24, the number of which may be varied and which may be formed of stainless steel or other suitable material, preferably formed integrally with or connected to the ring 20.

The maximum diameter portion 30a of the valve element 30 provides a seating surface which is adapted to engage in sealing contact with the inner surface 20a of the valve seat 20 (dash lines in FIG. 3). The external surface 30b of the valve element 30 is contoured and smoothly shaped in the form of a tear and terminating in a pointed end 30c which is remote from the valve seat 20. The surface 30d which is in proximity to the valve seat 20 when the valve element 30 is in the open position, is curved so as to bulge towards the valve seat 20 for causing relatively smooth flow of the blood around such surface within the aorta 10.

The external surface of the valve element 30 has a stop groove 30e which preferably has the same cross-sectional shape as the cross-sectional shape of a stop ring 35 which is integral with or is secured to the upper ends of the elongate guide members 24. The external surface 35a of the ring 35 is inclined so that when the valve element 30 is in its uppermost open position, such surface 35a is in alignment with the external surface 30b (FIG. 3).

The ring 35 is preferably made of stainless steel, but it may be made of other materials so long as it is suitably attached to the support members 24. The valve element 30 is preferably made of a very hard material such as condensed carbon sold under the trademark "PYROLITE."

The stop ring 35 thus stops the axial movement of the element 30 when it moves from the closed position to the open position, and the guide elements 24 maintain the valve element 30 in substantially axial alignment during such movement. The movement of the valve element 30 in the opposite direction when moving from the open position of FIG. 1 to the closed position of FIG. 2 is limited by the engagement of the lower surface 30d of the valve element with stop members 25 which are also preferably of stainless steel and are either integral with or are connected to the ring 20 so as to extend therebelow. The number of such stop members 25 may be varied.

The operation or use of the cardiac valve A of FIGS. 1-3 is believed evident from the foregoing description. The valve element 30 moves in accordance with the pulsatile flow of blood in or from the heart, depending upon its location, so as to operate in substantially the same manner as the normal mitral valve, tricuspid valve or aortic valve which it replaces. Because the valve element 30 is guided in its movement between the open and the closed positions at all times, it is maintained axially in the flow of the bloodstream and along the longitudinal axis of the aorta 10 to minimize turbulence of the blood when the blood is flowing through the valve A. Also, the particular shape of the valve element 30 as heretofore described minimizes and essentially eliminates turbulence in the blood flow through the open valve A.

A positive seating of the valve in both the open and closed positions is also accomplished. Vibration of the valve element 30 in the open position is prevented by the provision of the groove 30e with substantially the same cross-sectional area as the cross-sectional area of the stop ring 35.

Figure 4:
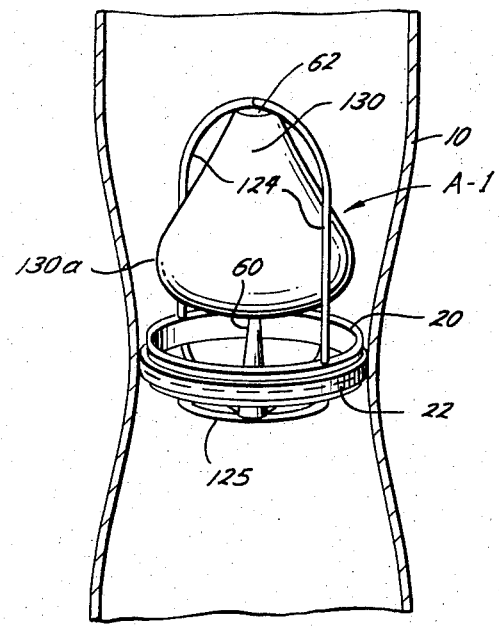
FIG. 4 is an isometric view of another form of the cardiac valve of this invention disposed in the aorta in the closed position.
Figure 5:
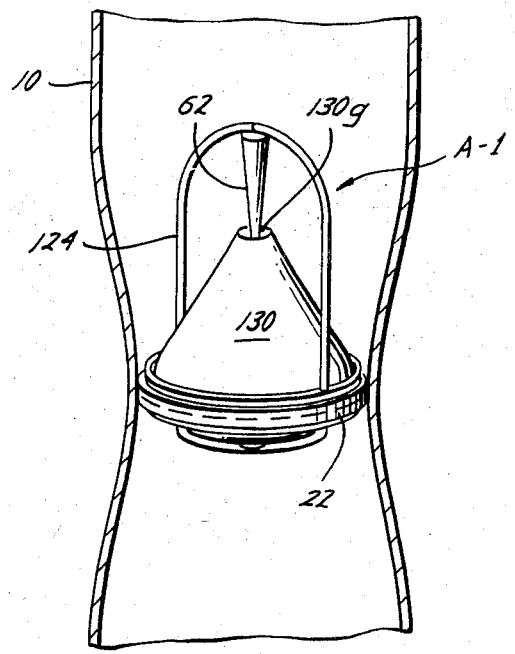
FIG. 5 is a view similar to FIG. 4, but showing that valve in the closed position.
Figure 6:
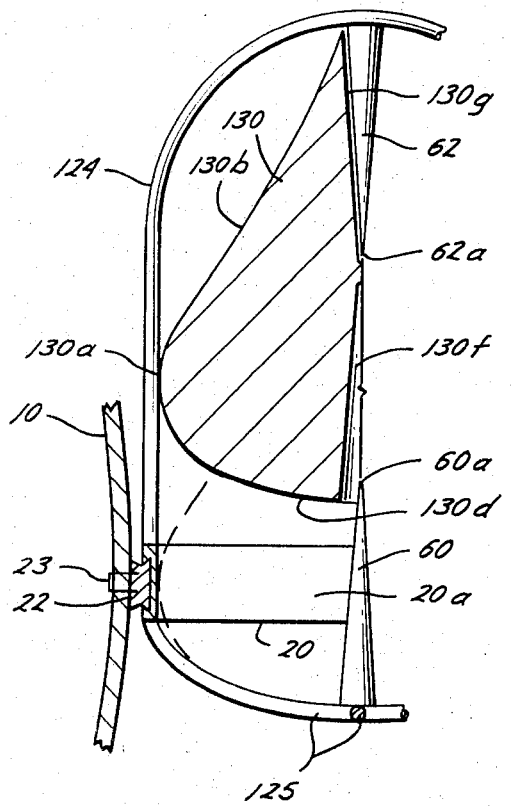
FIG. 6 is a partial sectional view of the valve of FIGS. 4 and 5, showing the valve in solid lines in the open position and in dash lines in the closed position.

In FIGS. 4-6 a modified cardiac valve A-1 is illustrated and it is likewise disposed in the aorta 10. The parts of the valve A-1 which are preferably identical to the parts of the valve A are designated with the same numerals and/or letters. Thus, the valve A-1 has the annular valve seat 20 with the annular attaching ring 22 secured thereto for the attachment of the valve seat 20 to the aorta 10 by suturing 23 or other suitable surgical means.

The valve element 130 has substantially the same external shape, namely, a tear drop shape as the valve element 30, except that a first tapered opening 130f is provided along the central axis near the larger portion at one end of the valve element while a second tapered opening 130g is disposed axially at the other end of the valve element 130 for a purpose to be hereinafter described. The maximum diameter portion 130a of the valve element 130 corresponds to the maximum diameter portion 30a of the valve element 30 and it seats in the same manner with the inside valve seating surface 20a of the seating ring 20. The surface 130b corresponds with the surface 30b and likewise the surface 130d corresponds with the surface 30d.

Only two elongate guide elements 124 are illustrated for the valve A-1, and they do not have to contact the surface 130a for guiding the axial movement of the valve element 130. The axial movement of the valve element 130 is guided by a first tapered pin 60 which is mounted on a pair of intersecting support elements 125 and the tip of which, indicated at 60a, extends at all times at least partially into the first opening 130f. The element 130 is also guided by a second tapered substantially conical shaped pin 62 which is secured to the support elements 124 and which extends into the correspondingly shaped tapered and substantially conical opening 130g. The tip 62a is at all times at least partially within the opening 130g.

The pins 60 and 62 are preferably made of stainless steel and they are also preferably both conically shaped, although other shapes for such pins may be utilized. The openings 130f and 130g would normally correspond to the shapes of the pins 60 and 62, respectively.

In the operation or use of the valve A-1 of this invention, the valve element 130 moves in the same manner as heretofore described with respect to the valve element 30 from the open position of FIGS. 4 and 6 (solid lines in FIG. 6) to the closed position of FIG. 5 (and also the dash lines of FIG. 6). Because of the essentially tear-shaped configuration of the valve element 130, the flow of blood around such element when the valve A-1 is in the open position is essentially nonturbulent. Also, the guiding of the valve element 130 axially during its movements to and from the open and the closed positions prevents vibration of the valve element 130 and thereby essentially eliminates turbulence which might otherwise result from such vibrations and non-axial movements.

The foregoing disclosure and description of the invention are illustrative and explanatory thereof, and various changes in the size, shape, and materials as well as in the details of the illustrated construction may be made without departing from the spirit of the invention.

I claim:

1. A prosthetic cardiac valve adapted to be disposed in the aortic, mitral or tricuspid rings comprising:

an annular valve seat adapted to be attached to the aortic, mitral or tricuspid rings;

a valve element having generally tear-drop external configuration, with an annular seating surface at substantially its maximum diameter portion for seating engagement with said valve seat for closing blood flow through said valve seat; and, guide means for axially guiding said valve element having a tapered axial opening in each end of said valve element and having a pair of tapered axially disposed guide pins, with one pin being in each of said openings, to maintain said valve element substantially in axial alignment at all times as said valve element moves to and from the closed position wherein the valve element is seated in contact with said valve seat and an open position wherein the valve element is away from said valve seat during pulsatile flow of blood through the valve, whereby turbulance of the blood during such flow around the valve is minimized.

2. The valve set forth in claim 1, wherein:

the ends of the tapered guide pins are spaced apart axially.

3. The valve set forth in claim 2, including:

means for limiting the extent of axial movement of said valve element relative to said pins to maintain at least the tip portion of one pin in one of said axial openings at all times.

4. The valve set forth in claim 2, including:

means mounted with said valve seat for supporting one of said pins for substantially full insertion into one of said axial openings when said element is in the open position; and means mounted with said valve seat for supporting the other of said pins for substantially full insertion into the other of said axial openings when said element is in the closed position.

5. A prosthetic cardiac valve adapted to be disposed in the aortic, mitral or tricuspid rings comprising:

an annular valve seat adapted to be attached to the aortic, mitral or tricuspid rings;

a valve element having a generally tear-drop external configuration, with an annular seating surface at substantially its maximum diameter portion for seating engagement with said valve seat for closing blood flow through said valve seat;

guide means for axially guiding said valve element having a plurality of axially extending elongate members circumferentially spaced relative to each other about said valve seat and each of said elongate members having a straight inner guide surface adapted to be engaged by a guide surface on said valve element, to maintain said valve element substantially in axial alignment at all times as said valve element moves to and from the closed position wherein said valve element is seated in contact with said valve seat and an open position wherein said valve element is away from said valve seat during pulsatile flow of blood through the valve, whereby turbulance of the blood during such flow around the valve is minimized;

an annular stop ring for limiting the extent of travel of said valve element from the closed position to the open position, wherein the external surface of said valve element has an annular groove, the cross-section of which is substantially the same as the cross-section of said stop ring, and the external surface of said stop ring substantially conforms with the external surface of said valve element on each side of said groove when said stop ring is in said groove of said valve element in the open position.

6. The valve set forth in claim 5, wherein:
said annular stop ring is mounted with said elongate members.

* * * * *